United States Patent [19]

Dege et al.

[11] Patent Number: 5,389,710
[45] Date of Patent: Feb. 14, 1995

[54] CRYSTALLIZATION MODIFIER FOR POLYESTER MOLDING COMPOSITIONS

[76] Inventors: Gerald J. Dege, 204 Mooney Rd., Flanders, N.J. 07836; Murali K. Akkapeddi, 7 Manor Dr., Morristown, N.J. 07960; Harold W. Tuller, Jones La., Long Valley, N.J. 07853; Nicholas Vanderkooi, Jr., 8 Van Riper Ave., Pompton Plains, N.J. 07444

[21] Appl. No.: 979,752

[22] Filed: Nov. 23, 1992

[51] Int. Cl.$^6$ .............................................. C08K 5/17
[52] U.S. Cl. .................... 524/243; 524/602; 524/604; 524/605; 525/411; 525/437
[58] Field of Search ............ 549/491; 564/505; 524/109, 243, 602, 604, 605, 607, 913; 525/437, 411; 264/331.21

[56] References Cited

U.S. PATENT DOCUMENTS

| | | |
|---|---|---|
| 3,435,093 | 3/1969 | Cope et al. . |
| 3,619,266 | 11/1971 | Weineermei . |
| 3,663,653 | 5/1972 | Frohlich et al. . |
| 4,029,694 | 6/1977 | Weipert et al. ............... 524/913 |
| 4,042,570 | 8/1977 | Bernert et al. ............... 525/411 |
| 4,133,803 | 1/1979 | Klein ........................ 524/602 |
| 4,223,113 | 9/1980 | Bier et al. . |
| 4,322,335 | 3/1982 | Nield . |
| 4,327,007 | 4/1982 | Vanderkooi, Jr. et al. . |
| 4,357,268 | 11/1982 | Vanderkooi et al. . |
| 4,385,144 | 5/1983 | Jones et al. . |
| 4,412,040 | 10/1983 | Albee, Jr. et al. . |
| 4,435,546 | 3/1984 | Bier et al. . |
| 4,486,561 | 12/1984 | Chung et al. . |
| 4,486,564 | 12/1984 | Deyrup . |
| 4,530,953 | 7/1985 | Yoshida ................... 364/331.21 |
| 4,539,352 | 9/1985 | Chung et al. . |
| 4,548,978 | 10/1985 | Garrison, Jr. . |
| 4,551,485 | 11/1985 | Ragan et al. . |
| 4,731,404 | 3/1988 | Haylock et al. . |

FOREIGN PATENT DOCUMENTS

| | | |
|---|---|---|
| 53-106891 | 9/1978 | Japan . |
| 55-165950 | 12/1980 | Japan . |
| 56-100838 | 8/1981 | Japan . |
| 61-37840 | 2/1986 | Japan . |
| 7304433 | 10/1973 | Netherlands . |
| 1224684 | 7/1986 | United Kingdom . |

*Primary Examiner*—Veronica P. Hoke
*Attorney, Agent, or Firm*—Michele G. Mangini; Roger H. Criss; Melanie L. Brown

[57] ABSTRACT

This invention relates to an improved polyester composition that has a wide temperature range of crystallization. The composition comprises a polyester and a chemically reacting crystallization modifier having the following formula:

$$H_2N-R^1-O-(R^2-O)_x-R^3-NH_2$$

wherein
R$^1$ and R$^3$ are independently selected from the group consisting of alkylene units having from about 2 to about 6 carbon atoms;
R$^2$ is a hydrocarbon radical of 2-6 carbon atoms; and
x is from 1 to 100.

20 Claims, No Drawings

CRYSTALLIZATION MODIFIER FOR POLYESTER MOLDING COMPOSITIONS

BACKGROUND OF THE INVENTION

1. Field of the Invention

The present invention relates to fast crystallizing semicrystalline polyester compositions useful in molding applications.

2. Description of the Prior Art

Polyethylene terephthalate (PET) is a semicrystalline, linear saturated thermoplastic polyester that is known for its outstanding mechanical and thermal properties. However, unmodified PET has a slow crystallization rate, especially at temperatures below 130° C.

Polycyclohexylenedimethylene terephthalate (PCT) also is a semicrystalline, saturated thermoplastic polyester. PCT is known for its high melting point as well as for its outstanding mechanical attributes comparable to those of PET. Similar to PET, unmodified PCT compositions also exhibit slow crystallization kinetics.

For molding applications of crystalline or semi-crystalline thermoplastic polymers, from practical and economical points of view, it is desirable to utilize polymers that can be molded in water heated molds which, in general, can only provide a molding temperature range of from about 76° C. (170° F.) to about 115° C. (240° F.). Therefore, it is desirable for these polymers to start crystallize at as high a temperature as possible upon the cooling of the polymer melt which was fed into the mold and continue to crystallize during the cooling to as low a temperature as possible. As is known in the art, such crystallization characteristic may be represented by $T_{cc}$ and $T_{ch}$, which are measured using a Differential Scanning Calorimeter (DSC). $T_{cc}$ is a measurement to determine at what temperature crystals first appear upon cooling from the melt. $T_{ch}$ is a measurement which indicates the temperature at which crystallization is no longer occurring upon cooling, and is determined by measuring the temperature at which crystals first appear upon heating an amorphous piece of a polymer. Therefore, it is desirable to provide PET compositions that have as high a $T_{cc}$ as possible and as low a $T_{ch}$ as possible, allowing crystal formation and growth over the widest possible temperature range.

In order to improve the crystallization characteristics of PET, a variety of additives have been utilized in the art. One important class of the additives is nucleating agents, which has the effect of elevating the $T_{cc}$ of polyalkylene terephthalates. A variety of inorganic and organic nucleating agents are disclosed, for example, in U.S. Pat. Nos. 4,357,268 to Vanderkooi et al., 4,327,007 to Vanderkooi et al., 4,322,335 to Nield, 3,619,266 to Kelkheim et al. and 4,551,485 to Ragan et al.

Another important class of the additives includes plasticizers. The plasticizers are known to have the effect of lowering the $T_{ch}$ of polyalkylene terephthalates. A variety of plasticizers have been disclosed in the prior art references. These include, for example, those materials disclosed in U.S. Pat. Nos. 4,327,007 to Vanderkooi et al., 4,731,404 to Haylock et al., 4,385,144 to Jones et al., 4,486,561 to Chung et al., 4,539,352 to Chung et al., 4,548,978 to Garrison, Jr., 4,223,113 to Bier et al., 4,435,546 to Bier et al., 4,486,564 to Deyrup and British Patent 1,224,684.

Although the prior art plasticizers promote desirable low-temperature crystallization characteristics in PET and PCT compositions, they may render the compositions not suitable for certain applications in that many of the conventional plasticizers do not chemically bond or have sufficient affinity to the polymer chains of the polyesters and, thus, do not form stable polyester compositions. Consequently, the conventional plasticizers tend to separate from and migrate out of the polyester compositions during post-compounding processes, such as molding processes, in the form of low molecular weight compounds that are volatile. Such unbound plasticizers which migrate to the surface of molded articles may degrade surface appearance and interfere with paintability and colorability. Furthermore, such unbound plasticizers may also volatilize to accumulate at various spots in the manufacturing equipments and facilities, leading to potential environmental and safety difficulties. Therefore, there remains a need to provide PET and PCT molding compositions that crystallize at a commercially practical range of molding temperatures and yet do not utilize volatile additives.

SUMMARY OF THE INVENTION

In accordance with the present invention there is provided a polyester composition comprising a semicrystalline polyester and a crystallization modifier selected from the compounds having the formula:

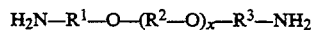

wherein $R^1$ and $R^3$ are independently selected from the group consisting of alkyl units having about 2 to about 6 carbon atoms, e.g., ethyl, n-propyl, isopropyl and n-butyl units; $R^2$ is a hydrocarbon radical of 2–6 carbon atoms; and x is from about 1 to about 100.

The chemically reacting crystallization modifiers of the present invention provide stable polyester compositions that have an improved crystallization temperature range, making the polyester composition highly suitable for various molding applications.

DETAILED DESCRIPTION OF THE INVENTION

The present invention provides a polyester composition comprising a polyester and an effective amount of an α,ω-bis(aminoalkyl)-polyoxyalkylene crystallization modifier having the formula:

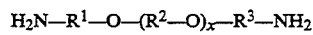

where
  $R^1$ and $R^3$ are independently selected from the group consisting of alkylene units having about 2 to about 6 carbon; atoms, e.g., ethylene, n-propylene, isopropylene, and n-butylene units;
  $R^2$ is a hydrocarbon radical having from about 2 to about 6 carbon atoms, preferably an aliphatic hydrocarbon radical having from about 2 to about 6 carbon atoms, most preferably an aliphatic hydrocarbon radical having 4 carbon atoms; and
  x is from about 1 to about 100, preferably from about 10 to about 75, most preferably from about 30 to about 65.

The polyester composition comprises from about 0.1 to about 15 weight percent, preferably from about 1 to about 10 weight percent, and more preferably from about 2 to about 5 weight percent, of the crystallization modifier based on the total weight of the composition.

The suitable polyesters for the present invention include semicrystalline polyesters such as homopolymers and copolymers of PET, homopolymers and copolymers of PCT, and blends thereof. As is well known in the art, PET homopolymer is a polycondensation product of ethylene glycol and terephthalic acid or dimethyl terephthalate, and PCT homopolymer is a polycondensation product of ethylene glycol and 1,4-cyclohexylenedimethanol.

The preferred PET and PCT copolymers may contain minor amounts, up to about 5%, of other comonomers, such as diethylene glycol, 1,4-cyclohexylenedimethanol, butylenediol, neopentyldiol, diethylene glycol, glutaric acid and the like. The PET and PCT suitable for use with the present invention have an intrinsic viscosity (IV) from about 0.3 to about 1.2, preferably from about 0.4 and about 0.7., wherein the IV value is obtained by extrapolation of viscosity values, which are normalized to 25° C., to zero concentration of solutions of PET in a 60 to 40 volume ratio of phenol and tetrachloroethane.

Illustrative values of $T_{ch}$ for pure PET having 0.5 intrinsic viscosity is approximately between 125° C. and 130° C., and for PCT is approximately between 130° C. and 140° C. As mentioned before, it is desirable to lower the $T_{ch}$ values as much as possible to attain improved plasticizing effects. The $T_{ch}$ should preferably be not higher than about 115° C., more preferably not higher than 110° C. for PET and PCT compositions.

It has been found that the crystallization modifier of the present invention chemically bonds to the polymer chains of PET and PCT, and lowers the $T_{ch}$ of PET and PCT compositions thereby allowing the polyester compositions to crystallize at lower temperatures without having the additive migration and volatilization problems of the prior art plasticized polyester compositions. In addition, the crystallization modifier of the present invention also acts to elevate the $T_{cc}$ of PET and PCT, especially when a high molecular weight crystallization modifier is utilized, thereby initiating the crystallization of PET and PCT compositions at a higher temperature. Furthermore, the effects of lowering $T_{ch}$ of the present crystallization modifier improve the mold release properties and surface appearance of the molded articles.

The polyester compositions of the present invention preferably contain an additional nucleating agent in combination with the polyester and the crystallization modifier. The nucleating agents are preferably the sodium or potassium salt of hydrocarbon acids containing from about 3 to about 54 carbon atoms and at least one, preferably from 1 to 3, carboxyl group. The hydrocarbon acids can be aromatic or aliphatic acids. Preferred nucleating agents also include polymeric salts of copolymers comprising an α-olefin and an α,β-ethylenically unsaturated carboxylic acid that are neutralized up to 100% with a cation derived from a metal of Group IA, IIA, IIB, IIIA and IVA and the transition elements of the Periodic Table of Elements. Illustrative of the α-olefins useful in the preparation of the copolymers of the present invention are ethylene, propylene, butene-1 and pentene-1. Of these, the most preferred is ethylene. Illustrative of α,β-ethylenically unsaturated carboxylic acids useful in the preparation of the copolymers are acrylic acid, methacrylic acid, ethacrylic acid, itaconic acid, maleic acid, fumaric acid, and monoesters of dicarboxylic acids, such as itaconic acid, maleic acid, fumaric acid, methyl hydrogen maleate, methyl hydrogen fumarate and maleic anhydride. Other useful copolymer salts are further disclosed in U.S. Pat. Nos. 4,412,040 and 3,435,093, and both are hereby incorporated by reference.

The polyester composition of the present invention contains from about 0.5 to about 15 percent, preferably about 1 to about 10 percent, more preferably about 1.5 to about 5 percent, based on the weight of polyester, of a nucleating agent.

The polyester composition of the present invention can also contain additional ingredients conventionally utilized in polyester compositions including inert nucleating agents, such as talc, reinforcing materials, fillers, impact modifiers, epoxides, polycarbodiimides, phosphites, antioxidants, lubricants, mold-release agents, pigments, flame retardants, ultraviolet light and heat stabilizers, and the like.

The suitable fillers or reinforcing materials for the present polyester composition include glass fibers, graphite or aramid fibers, glass beads, aluminum silicate, asbestos, wollastonite, mica, calcium carbonate, talc, and the like. The preferred fillers are glass fibers. Typically, such filler or reinforcing materials are present in an amount of from about 1 to about 65 weight percent, preferably from about 10 to about 55 weight percent, based on the total weight of the composition.

The suitable impact modifiers for the present polyester composition include core-shell rubbers, e.g., poly(methyl methacrylate-g-butadiene/styrene); methacrylate-butadiene-styrene (MBS) rubbers; high rubber acrylonitrile-butadiene-styrene (high rubber ABS); ethylene propylene rubbers functionalized with carboxylic adid, anhydride or amino groups; and ethylene/glycidyl methacrylate copolymers and terpolymers. Typically such impact modifiers are present in an amount of from about 1 to about 40 weight % based on the total weight of the composition.

In a conventional manner, the polyester composition herein may contain epoxides, polycarbodiimides and/or organo-phosphites, which act as viscosity stabilizers and/or chain extenders for polyesters by either preventing hydrolysis or compensating for the chains broken by hydrolysis. The suitable viscosity stabilizing epoxides include epoxides formed from bisphenol-A and glycidyl ether, and polyepoxides obtained by reacting orthocresol novolac and epichlorohydrine. Preferably, there is up to 5%, more preferably about 0.2% to about 2%, based on the weight of the compositions, of the epoxide. Polycarbodiimides suitable as viscosity stabilizing additives for PET and PCT include poly(2,4,6-triisopropyl m-phenylene)carbodiimides of varying molecular weight.

The preferred polyester compositions of the present invention comprise, based on the total weight of the compositions, from about 30 to 80 percent of PET or PCT, from about 10 to 65 percent of a filler or reinforcing material, from about 1 to about 10 percent of the crystallization modifier, from about 1 to about 5 percent of a nucleating agent, and from about 0.2 to about 2 percent of an epoxide.

As is known in the art, the compositions of the present invention can be formed by blending the components together by any conventional means to obtain an intimate blend. For example, the polyester can be dry mixed in a suitable blender or tumbler with the other components and then melt extruded. If desired, a reinforcing or filler material can be omitted initially and added after the first melt, and the resulting mixture can be melt extruded.

It has been unexpectedly found that the polyester compositions containing the crystallization modifier of the present invention exhibit a low $T_{ch}$ and a high $T_{cc}$, making the compositions suitable for use in molding applications using water heated molding equipments. In addition, the low $T_{ch}$ of the PET compositions of the present invention results in good surface appearance and helps mold release characteristics of molded articles.

The examples and compositions set forth below illustrate the nature of the invention and the manner of carrying it out. However, the invention should not be considered as being limited to the details thereof.

Flexural modulus, flexural strength, and unnotched Izod were measured in accordance with the ASTM D-790-90, D-790-90, and D-256-90 testing procedures, respectively. $T_{cc}$ was measured by placing a sample of between 5 and 10 milligrams in a Differential Scanning Calorimeter and heating the sample to 280° C. and holding for two minutes, and then cooling the sample at 10° C. per minute. $T_{ch}$ was measured by heating an amorphous sample specimen of between 5 and 10 milligrams at 10° C. per minute starting from 40° C. The amorphous sample specimen was prepared by melting each samples and quickly quenching to room temperature. The percentage of bound crystallization modifier was calculated from a nitrogen content analysis of each test specimen after exhaustively soxhlet-extracting in chloroform for 3 to 4 days since the only source of unextractable nitrogen in the test specimen polyesters was the bound crystallization modifier. The nitrogen content analysis was conducted in a CHN analyzer model #2400, manufactured by Perkin-Elmer.

EXAMPLES

Example 1

70 g of PET having 0.66 dl/g IV, which was vacuum (1 mmHg) dried at 110° C. for 3 days, was heated to about 320° C. in a 1 l stainless steel resin pot equipped with a mechanical stirring device under a nitrogen sweep. The temperature was lowered to 296° C. once the PET was melted and then 30 g of bis(3-aminopropyl)-polytetrahydrofuran (APTHF) having a molecular weight of about 2100 was quickly injected via a hot hypodermic syringe. The mixture was held at 296° C. for about 30 minutes with stirring. The reaction mixture was cooled to room temperature and analyzed. The results are shown in Table 1.

Control 1 (C1)

A PET test specimen was prepared in accordance with Example 1 except the crystallization modifier was not added.

TABLE 1

|  | Ex 1 | C1 |
|---|---|---|
| IV | 0.31 | 0.66 |
| $T_{ch}$ (°C.) | 93 | 134 |
| $T_{cc}$ (°C.) | 203 | 198 |
| $T_m$ (°C.) | 244 | 249 |
| $T_g$ (°C.) | — | 81 |
| % Bound APTHF | 14.4 | — |

In Example 1, an excessive amount of the crystallization modifier was utilized to demonstrate the improved crystallization temperature characteristics of the PET composition. The results show that the crystallization modifier of the present invention decreases the $T_{ch}$ of PET.

Examples 2–7 (Ex 2–7)

The test specimen preparation procedure outlined in Example 1 was repeated with the composition ingredients outlined in Table 2 for Examples 2–7. The PET utilized herein had an IV of 0.67. The number following APTHF in the table indicates molecular weight of each compound. The results are also shown in Table 2.

TABLE 2

| REACTION OF BIS-(3-AMINOPROPYL)-POLYTETRAHYDROFURAN WITH PET. | | | | | | |
|---|---|---|---|---|---|---|
| Example | Ex 2 | Ex 3 | Ex 4 | Ex 5 | Ex 6 | Ex 7 |
| APTHF 750, g | 2.0 | 4.4 | — | — | — | — |
| APTHF 2100, g | — | — | 1.9 | 5.1 | — | — |
| APTHF 4600, g | — | — | — | — | 5.0 | 8.0 |
| PET, g | 98.0 | 95.6 | 98.1 | 94.9 | 95.0 | 92.0 |
| Product: | | | | | | |
| I.V. | 0.60 | 0.55 | 0.59 | 0.54 | 0.62 | 0.62 |
| % APTHF (bound) | 1.3 | 3.5 | 1.5 | 3.0 | 4.9 | 6.6 |
| DSC: | | | | | | |
| $T_{ch}$ | 123.5° C. | 117.0° C. | 120.5° C. | 112.5° C. | 119.5° C. | 117.5° C. |
| $T_{cc}$ | 192.0° C. | 197.0° C. | 194.5° C. | 195.5° C. | 209.0° C. | 214.5° C. |
| $T_m$ | 247.5° C. | 249.5° C. | 248.5° C. | 249.5° C. | 254.0° C. | 254.5° C. |
| $T_g$ | 75.0° C. | 74.0° C. | 71.5° C. | 70.5° C. | 79.5° C. | 78.0° C. |

The results shown in Table 2 demonstrate that the crystallization modifiers of the present invention substantially decrease the $T_{ch}$ of PET without significantly changing other thermal characteristics, and for the high molecular weight crystallization modifiers, the modifiers not only substantially decrease the $T_{ch}$ but also significantly increased the $T_{cc}$. In addition, the amount of bound APTHF, i.e., unextractable APTHF, indicates that most of the crystallization modifiers utilized in the test specimen compositions are chemically reacted and bound to the resulting PET polymer compositions.

Examples 8–11 (Ex 8–11)

PET compositions having the ingredients listed in Table 3 were prepared by using a 1¼ inch (3.2 cm) Killion single screw extruder which has a L/D ratio of 24/1. The temperature profile of the extruder was 277° C. (530° F.) for all four zones and 288° C. (550° F.) for the die.

The PET utilized in the examples had an intrinsic viscosity of 0.68–0.75 dl/g. The PET was vacuum dried for 3 days at 155° C. The glass fiber used was ⅛ inch (0.3 cm) long chopped glass fiber. The epoxide compound used in the compositions as the molecular weight enhancer was a diglycidyl ether of bisphenol A. As the impact modifier, ethylene methylacrylate copolymer having about 80 mole percent ethylene was used. The antioxidant used was Irganox ® 1010, which is understood to be tetrakis (methylene 3-(3,5-ditertiary-butyl-4-hydroxyphenyl)propionate) methane. As the processing aid, sodium stearate was used. The nucleating agent used was a copolymer of 85 mole percent ethylene and 15 mole percent acrylic acid which was 80% sodium neutralized and had a molecular weight of about 3000. Plasticizer 1 and Plasticizer 2 utilized were APTHFs having molecular weights of about 2100 and 700, respectively.

Control 2 (C2)

A PET composition without any nucleator and plasticizer was prepared in accordance with the procedure and using the components disclosed in Example 1.

TABLE 3

| Example | Ex 8 | Ex 9 | Ex 10 | Ex 11 | C2 |
|---|---|---|---|---|---|
| PET | 61.68 | 60.68 | 61.68 | 60.68 | 67.25 |
| Nucleator | 2.0 | 2.0 | 2.0 | 2.0 | — |
| Plasticizer 1 | 2.9 | 3.9 | — | — | — |
| Plasticizer 2 | — | — | 2.9 | 3.9 | — |
| Glass Fiber | 30.0 | 30.0 | 30.0 | 30.0 | 30.0 |
| Impact Modifier | 2.2 | 2.2 | 2.2 | 2.2 | 2.2 |
| Weight Enhancer | 0.6 | 0.6 | 0.6 | 0.6 | — |
| Antioxidant | 0.4 | 0.4 | 0.4 | 0.4 | 0.25 |
| Processing Aid | 0.22 | 0.22 | 0.22 | 0.22 | 0.30 |

The PET compositions prepared above were tested for various physical and chemical characteristics as indicated in Table 4.

TABLE 4

| Example | Ex 8 | Ex 9 | Ex 10 | Ex 11 | C3 |
|---|---|---|---|---|---|
| IV | 0.44 | 0.46 | 0.40 | 0.38 | 0.62 |
| $T_{ch}$ (°C.) | 110 | 110 | 103 | 101 | 123 |
| $T_{cc}$ (°C.) | 220 | 221 | 221 | 222 | 209 |
| % Bound Plasticizer | 3.0 | 3.76 | 1.34 | 1.61 | — |
| Flex. Strength | | | | | |
| (x $10^3$ psi) | 30.3 | 28.2 | 27.1 | 25.1 | 36.8 |
| (MPa) | 209 | 194 | 187 | 173 | 254 |
| Flex. Modulus | | | | | |
| (x $10^6$ psi) | 1.24 | 1.17 | 1.30 | 1.26 | 1.38 |
| (x $10^3$ MPa) | 8.55 | 8.07 | 8.96 | 8.69 | 9.52 |
| Izod, Unnotched | | | | | |
| (ft-lbs/in) | 16.3 | 14.6 | 9.9 | 10.2 | 22.7 |
| (J/m) | 870 | 779 | 528 | 545 | 1209 |

As can be seen from Table 4, the PET compositions of the present invention provide substantially improved $T_{cc}$ and $T_{ch}$ without significantly effecting the physical properties of the compositions such as flexural strength and flexural modulus.

Example 12 (Ex 12)

92 g of PCT having 0.65 dl/g IV, which was vacuum (1 mmHg) dried at 110° C. for 3 days, was heated to about 330° C. in a 1 l stainless steel resin pot equipped with a mechanical stirring device under a nitrogen sweep. Once the PCT was melted, 8 g of APTHF having a molecular weight of about 2100 was quickly injected via a hot hypodermic syringe. The mixture was held at 330° C. for about 30 minutes with stirring. The reaction mixture was cooled to room temperate and analyzed. The results are shown in Table 5.

Control 3 (C3)

Unprocessed PCT was analyzed as a control.

TABLE 5

| | Ex 12 | C3 |
|---|---|---|
| IV | 0.31 | 0.65 |
| $T_{ch}$ (°C.) | 92.5 | 134 |
| $T_{cc}$ (°C.) | 263 | 246 |
| $T_m$ (°C.) | 288 | 294 |
| $T_g$ (°C.) | 66.5 | 95 |
| % Bound APTHF | 4.5 | — |

As can be seen from the above table, the PCT composition with the crystallization modifier of the present invention has a wider temperature range of crystallization, i.e., the $T_{cc}$ is higher and $T_{ch}$ is lower than those of PCT without the modifier.

The polyester compositions of the present invention utilizing the chemically binding crystallization modifiers disclosed herein provide stable polyester compositions having high $T_{cc}$ and low $T_{ch}$, making the polyester compositions suitable for various molding applications that utilize water heated molds.

What is claimed is:

1. A polyester composition comprising a polyester and a crystallization modifier selected from the compounds having the formula:

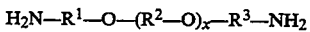

wherein $R^1$ and $R^3$ are independently selected from the group consisting of alkylene units having from about 2 to about 6 carbon atoms;

$R^2$ is a hydrocarbon radical having from about 2 to about 6 carbon atoms; and x is from about 1 to about 100.

2. A polyester composition according to claim 1, wherein $R^1$ and $R^2$ are selected from the group consisting of ethylene, n-propylene, isopropylene and n-butylene units.

3. A polyester composition according to claim 1, wherein $R^1$ and $R^2$ are n-propylene units.

4. A polyester composition according to claim 1, wherein x is from about 10 to about 75.

5. A polyester composition according to claim 1, wherein x is from about 30 to about 65.

6. A polyester composition according to claim 1, wherein said composition further comprises a nucleating agent.

7. A polyester composition according to claim 6, wherein said nucleating agent is a polymeric salt of a copolymer comprising an α-olefin and an α,β-ethylenically unsaturated carboxylic acid that are neutralized up to 100% with a cation derived from a metal of Group IA, IIA, IIB, IIIA and IVA and the transition elements of the Periodic Table of Elements.

8. A polyester composition according to claim 1, wherein said composition further comprises a filler.

9. A polyester composition according to claim 8, wherein said filler is a glass fiber.

10. A polyester composition according to claim 1, wherein said composition further comprises an impact modifier.

11. A polyester composition according to claim 1, wherein said polyester is polyethylene terephthalate.

12. A polyester composition according to claim 1, wherein said polyester is polycyclohexylenedimethylene terephthalate.

13. A polyester molding composition, based on the total weight of the composition, comprising
from about 30 wt % to about 80 wt % of a semicrystalline polyester;
from about 1 wt % to about 65 wt % of a filler;
from about 1 wt % to about 10 wt % of a crystallization modifier having the formula:

$$H_2N-R^1-O-(R^2-O)_x-R^3-NH_2$$

wherein $R^1$ and $R^3$ are independently selected from the group consisting of alkylene units having from about 2 to about 6 carbon atoms;
$R^2$ is a hydrocarbon radical having from about 2 to about 6 carbon atoms; and
x is from about 1 to about 100.

14. A polyester molding composition according to claim 13, wherein said composition further comprises from about 1 wt % to about 15 wt % of a nucleating agent.

15. A polyester molding composition according to claim 14, wherein said nucleating agent is a polymeric salt of a copolymer comprising an α-olefin and an α,β-ethylenically unsaturated carboxylic acid that are neutralized up to 100% with a cation derived from a metal of Group IA, IIA, IIB, IIIA and IVA and the transition elements of the Periodic Table of Elements.

16. A polyester molding composition according to claim 13, wherein said polyester is polyethylene terephthalate.

17. A polyester molding composition according to claim 13, wherein said polyester is polycyclohexylenedimethylene terephthalate.

18. A polyester molding composition according to claim 13, wherein x is from about 10 to about 75.

19. A polyester molding composition according to claim 13, wherein $R^1$ and $R^2$ are selected from the group consisting of ethylene, n-propylene, isopropylene, and n-butylene units.

20. A polyester composition comprising polyethylene terephthalate and a crystallization modifier selected from the compounds having the formula:

$$H_2N-R^1-O-(R^2-O)_x-R^3-NH_2$$

wherein $R^1$ and $R^3$ are propylene units;
$R^2$ is butylene unit; and
x is from about 1 to about 100.

* * * * *